United States Patent Office 3,271,254
Patented Sept. 6, 1966

3,271,254
17α-CHLORETHYNYL-17β-ALKOXY STEROIDS AND PROCESS FOR THEIR PREPARATION
Colin Michael Burgess, Peter Feather, and Vladimir Petrow, London, England, assignors to The British Drug Houses Limited
No Drawing. Filed Aug. 22, 1963, Ser. No. 303,935
Claims priority, application Great Britain, Aug. 24, 1962, 32,638/62
24 Claims. (Cl. 167—74)

This invention is for improvements in or relating to organic compounds and has particular reference to a new class of steroidal derivatives, namely the 17α-chlorethynyl-17β-alkoxy derivatives of perhydrocyclopentenophenanthrene and processes for their preparation.

The compounds of the present invention are of value on account of their biological and pharmacological properties and as intermediates for the preparation of biologically and pharmacologically active materials. Thus, for example, they may have steroid-hormonal and antihormonal properties. Such properties may include oestrogenic properties, progestational properties, claudogenic properties (see Petrow, J. Pharm. Pharmacol., 1960, 12, 1704) and ovulation-inhibiting properties.

It is an object of the present invention to provide new 17α-chlorethynyl-17β-alkoxy steroids having the general Formula I below.

According to the present invention there is provided a process for the preparation of 17α-chlorethynyl-17β-alkoxy steroids, having, apart from substituents and unsaturated linkages in rings A, B, C and D, the general formula

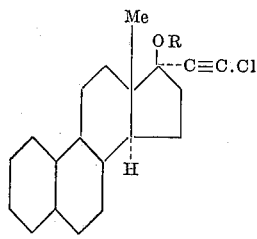

(I)

where R represents an alkyl group containing up to 5 carbon atoms, which process comprises reacting an appropriate alkyl halide with the alkali-metal derivative of the corresponding 17α-chlorethynyl-17β-hydroxy-steroid in an anhydrous non-hydroxylic solvent.

The anhydrous non-hydroxylic solvent may be liquid ammonia or ether or tetrahydrofuran or a mixture of such solvents.

The alkali-metal derivative of the 17α-chlorethynyl-17β-hydroxy-steroid, which may be the sodium derivative, may be prepared by methods of prior art. Thus, for example, the 17α-chlorethynyl-17β-hydroxy-steroid (prepared as described in Belgian Patent No. 606,935) may be dissolved in a non-hydroxylic organic solvent such as ether, tetrahydrofuran or dimethylformamide, and then treated with an amide of an alkali-metal, such as sodamide in, for example, liquid ammonia. Alternatively, the alkali-metal derivative of a 17α-chlorethynyl-17β-hydroxy-steroid, formed by the interaction of the corresponding 17-oxo-steroid with a chloracetylide of an alkali-metal according to Belgian Patent No. 606,935 or British patent application No. 7,119/62 may be utilised in situ.

When liquid ammonia is employed as a solvent the process of the invention is normally carried out at a temperature between −80° C. and the reflux temperature of the mixture. In other cases, temperatures between 0° C. and the reflux temperature of the mixture may be used. The alkyl halide is usually employed in a molar proportion approximately equal to or exceeding the theoretical quantity required. When methyl iodide is the alkyl halide employed, the reaction is usually complete in 1 to 3 hours. In other cases, longer reaction times are usually necessary.

The 17α-chlorethynyl-17β-alkoxy steroidal products (I) may be isolated from the reaction mixture by methods apparent to those skilled in the art. For example, the reaction mixture may be treated with water or ice, an acid such as acetic acid may be added if desired and the steroidal product may then be isolated by filtration or by extraction with an organic solvent such as ether or benzene.

As will be apparent to those skilled in the art, the process of the invention may be applied to steroids containing, in addition to the groups at $C_{17}$, a variety of substituents and unsaturated linkages in rings A, B, C and D. Thus, the process may be applied to steroids containing unsaturated linkages at $C_1$, $C_3$, $C_4$, $C_{5(6)}$, $C_{9(11)}$, and $C_{11(12)}$, and to combinations of such unsaturated linkages such for example as $\Delta^2$ and $\Delta^{5(10)}$ or $\Delta^3$ and $\Delta^5$, and to combinations of three or more unsaturated linkages which together form an aromatic system. Such unsaturated linkages do not in general interfere with the process of the invention.

Hydroxyl groups at positions other than $C_{17}$, such as hydroxyl groups at $C_1$, $C_2$, $C_3$, $C_4$, $C_5$, $C_6$ and $C_{11}$ may be protected if desired by prior conversion into the tetrahydropyranyl derivatives by methods well known to those skilled in the art, and subsequently regenerated. However, in many cases, a satisfactory product may be obtained without such protection. Thus, for example 17α-chlorethynyl-androst-5-en-3β,17β-diol treated with approximately equimolar proportions of sodamide and then methyl iodide, gives directly a satisfactory yield of 17α-chlorethynyl-17β-methoxy-androst-5-en-3β-ol. Phenolic groups in rings A and B will, in general, require protection and subsequent regeneration.

Acyl groups may be hydrolysed during the course of the preparation of the alkali-metal derivative of the steroid and in such cases a sufficient excess of the alkali-metal compound will need to be used, the acyl groups requiring subsequent regeneration.

Alkyl, alkenyl and alkynyl groups containing up to 5 carbon atoms, such, for example, as methyl, vinyl and propynyl groups, and, in particular, methyl groups at $C_2$, $C_4$ and $C_6$, do not interfere with the process of the invention.

Oxo-groups, and in particular oxo-groups at $C_3$, $C_4$, $C_6$ and $C_{11}$, do not in general interfere with the reaction between the alkyl halide and the alkali-metal derivative of the 17α-chloroethynyl-17β-hydroxy-steroid. Readily enolisable oxo-groups such for example as those present in the 3-oxo-$\Delta^4$-, 3-oxo-4-hydroxy-$\Delta^4$-, 3,6-dioxo-$\Delta^4$ systems may require protection and subsequent regeneration; such protection may be achieved by methods of prior art, such, for example, as enol ether formation, ketal formation or enamine formation.

The process of the invention is particularly applicable to the preparation of derivatives of androstane represented by general Formulae II, III, IV, V, VI and VII and of derivatives of oestrane represented by general Formulae VIII, IX, X, XI and XII.

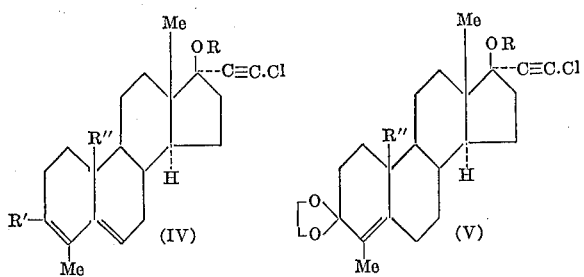

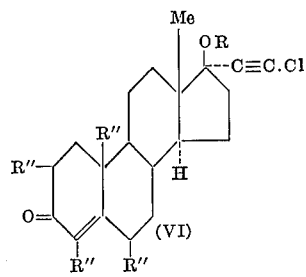

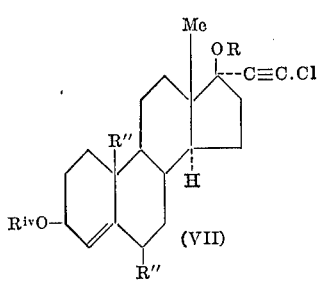

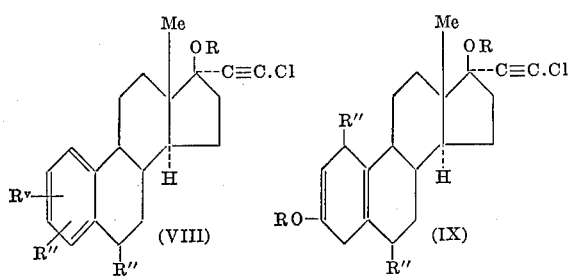

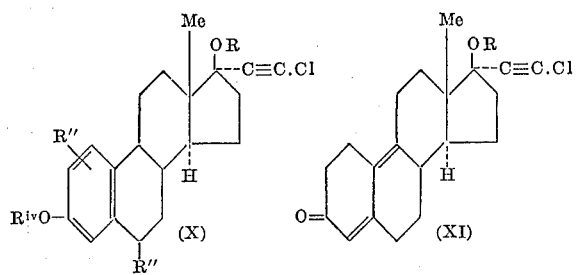

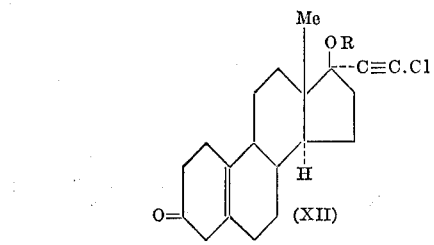

where

R is an alkyl group containing not more than 5 carbon atoms,

R' is H or OX (where X is lower alkyl, cyclic alkyl or benzyl),

R" is H or Me,

R''' is

or

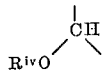

or (Acyl)O−CH⟨

$R^{iv}$ is H or lower alkyl, cyclic alkyl, benzyl or tetrahydropyranyl, $R^v$ is Me, H or Cl.

The process of the invention is particularly applicable to the preparation of the substances represented by Formulae XI and XII (R=Me). In a typical preparation of (XII; R=Me) 17α-chlorethynyl-3-methoxy-oestra-2,5(10)-dien-17β-ol (Belgian Patent No. 606,935) dissolved in anhydrous tetrahydrofuran is added to a suspension of sodamide in liquid ammonia and the mixture is stirred for 1 hour at approximately −80° C. A solution of methyl iodide in tetrahydrofuran is then added and the mixture stirred for a further 3 hours before being poured on to ice. Filtration, after the ice has melted, yields 17α-chlorethynyl-3,17β-dimethoxy-oestra-2,5(10)-diene (IX; R=Me, R"=H). This may be treated with oxalic acid in aqueous methanol at room temperature to yield the 3-oxo-Δ$^{5(10)}$-steroid (XII; R=Me). To convert (XII) into (XI), the former compound is treated with bromine in pyridine by the method of M. Perelman et al., J. Amer. Chem. Soc., 1960, 82, 2402, yielding the 3-oxo-4,9(10)-diene (XI; R=Me).

17α-chlorethynyl-17β-methoxy-oestr - 5(10) - en-3-one, 17α-chlorethynyl-17β - methoxy - 19 - nor-androst-4-en-3-one and 17α-chlorethynyl-17β-methoxy-oestra-4,9(10)-dien-3-one possess valuable claudogenic, ovulation inhibiting and progestational properties. 17α-chlorethynyl-17β-methoxy-oestra-1,3,5(10)-trien-3-ol is of value on account of its oestrogenic and claudogenic properties in, for example, the veterinary field. The 3-alkyl-enol ethers of 17α-chlorethynyl - 17β - methoxy - androst-4-en-3-one, 17α-chlorethynyl-17β-methoxy-4-methyl - androst-4-en-3-one and 17α-chlorethynyl-17β-methoxy-6-methyl-androst-4-en-3-one are of value on account of their progestational and ovulation inhibiting properties. With respect to claudogenic activity, 17α-chlorethynyl-3,17β-dimethoxy-oestra-1,3,5(10)-triene inhibits implantation of the fertilised ovum in female mice, preventing development of pregnancy when administered between the day of mating and the time of implantation. It has approximately one-third of the activity of stilboestrol in this respect. Furthermore, interruption of pregnancy can be produced as by stilboestrol when administered post-implantation at higher dose levels.

17α-chlorethynyl-3,17β-dimethoxy - oestra - 1,3,5(10)-triene also possesses oestrogenic properties. In an assay based on increase in uterine weight in immature rats, it has approximately one eightieth of the activity of stilboestrol.

Following is a description by way of example of methods of carrying the invention into effect.

EXAMPLE 1

*17α-chlorethynyl-17β-methoxy-androst-5-en-3β-ol 3-acetate*

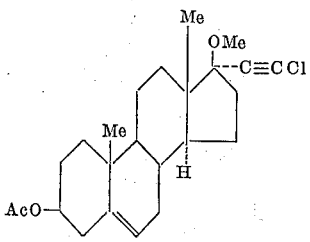

Sodium metal (0.22 g.) and a trace of ferric nitrate were added to liquid ammonia (75 ml.) at −80 to −60° C. and the mixture was stirred until the blue colour disappeared. A solution of 17α-chlorethynyl-androst-5-en-3β,17β-diol (3.36 g.) (Belgian Patent No. 606,935) in anhydrous tetrahydrofuran (50 ml.) was added dropwise and the mixture was stirred for 2 hours. Methyl iodide (0.60 ml.) in anhydrous tetrahydrofuran (5 ml.) was then added, stirring was continued at −80 to −60° C. for a further 3 hours and the mixture was poured on to ice. After the ice had melted, a slight excess of acetic acid was added, and the precipitate of 17α-chlorethynyl-17β-methoxy-androst-5-en-3β-ol was collected, washed with water, and recrystallised from aqueous methanol as colourless needles, M.P. 144° C., $[\alpha]_D^{27}$ −128° (c., 0.812 in dioxan), $\nu_{max.}^{CCl_4}$ 3620, 2200, 1666 cm.$^{-1}$, $\nu_{max.}^{CS_2}$ 1096, 1052, 1031 cm.$^{-1}$ This material was heated for 1 hour on the steam-bath with a mixture of pyridine (20 ml.) and acetic anhydride (20 ml.). Pouring into water gave a solid which recrystallised from aqueous methanol yielding 17α-chlorethynyl-17β-methoxy-androst-5-en-3β-ol 3-acetate as colourless plates, M.P. 110–110.5° C., $[\alpha]_D^{27}$ −121° (c., 0.956 in dioxan), $\nu_{max.}^{CCl_4}$ 2200, and 1733 cm.$^{-1}$, $\nu_{max.}^{CS_2}$ 1366, 1240, 1138, 1098, 1029, 901 and 837 cm.$^{-1}$.

The compound had claudogenic activity.

EXAMPLE 2

*17α-chlorethynyl-3,17β-dimethoxy-oestra-1,3,5(10)-triene*

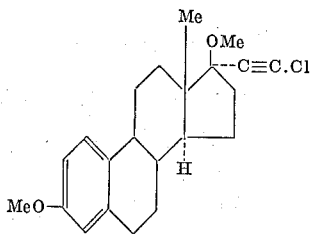

Sodium metal (0.22 g.) and a trace of ferric nitrate were added to liquid ammonia (75 ml.) at −80 to −60° C. and the mixture was stirred until the blue colour disappeared. A solution of 17α-chlorethynyl-3-methoxy-oestra-1,3,5(10)-trien-17β-ol (3.31 g.) (Belgian Patent No. 606,935) in anhydrous tetrahydrofuran (50 ml.) was added dropwise and the mixture was stirred for 2 hours. Methyl iodide (0.60 ml.) in anhydrous tetrahydrofuran (5 ml.) was added, stirring was continued at −80 to −60° C. for a further 3 hours and the mixture was poured on to ice. After the ice had melted, a slight excess of acetic acid was added and the precipitate was collected, washed with water and dried. Purification by chromatography in benzene on alumina followed by re-crystallisation from methanol, yielded 17α-chlorethynyl-3,17β-dimethoxy-oestra - 1,3,5(10) - triene as colourless plates, M.P. 114–114.5° C., $[\alpha]_D^{27}$ −20.1° (c., 0.933 in dioxan), $\lambda_{max.}$ 278 mμ (ε, 2115) and 287 mμ (ε, 2,000)

$\nu_{max.}^{CCl_4}$ 2200 and 1608 cm.$^{-1}$, $\nu_{max.}^{CS_2}$ 1281, 1253, 1238, 1099, 1048, 869, 818, 779 cm.$^{-1}$.

The compound had oestrogenic and claudogenic activity.

EXAMPLE 3

*17α-chlorethynyl-3,17β-dimethoxy-oestra-1,3,5(10)-triene*

Sodium (4.05 g.) and a trace of ferric nitrate were added to liquid ammonia (300 ml.) and the mixture was stirred under reflux until the blue colour had disappeared. The mixture was cooled to −60° C. and a solution of transdichlorethylene (8.5 g.) in anhydrous ether (25 ml.) was added during 15 minutes. The cooling-bath was removed and the mixture was stirred under reflux for 30 minutes. A suspension of oestrone-3-methyl ether (5.0 g.) in anhydrous tetrahydrofuran (75 ml.) was added during 15 minutes, and the mixture was stirred under reflux for 3 hours, and then cooled to −60° C. A solution of methyl iodide (12.75 g.) in tetrahydrofuran (20 ml.) was added and the mixture was stirred for a further three hours and then poured on to ice. After the ice had melted the precipitate was collected, washed with water and dried. Purification by chromatography in benzene on alumina, followed by recrystallisation from methanol, yielded 17α - chlorethynyl - 3,17β - dimethoxy-oestra-1,3,5(10)-triene, identical with the product of Example 2.

EXAMPLE 4

*17α-chlorethynyl-3,17β-dimethoxy-oestra-2,5(10)-diene*

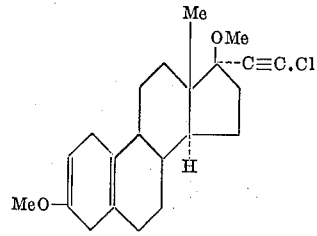

Sodium (0.67 g.) and a trace of ferric nitrate were added to liquid ammonia (100 ml.) at −80° C. to −60° C. and the mixture was stirred until the blue colour disappeared. A solution of 17α-chlorethynyl-3-methoxy-oestra-2,5(10)-dien-17β-ol (Belgian Patent No. 606,935) (4.0 g.) in anhydrous tetrahydrofuran (100 ml.) was added dropwise and the mixture was stirred for 1 hour. Methyl iodide (1.85 ml.) in anhydrous tetrahydrofuran (15 ml.) was added, stirring was continued at −80 to −60° C. for a further 3 hours, and the mixture was poured on to ice. After the ice had melted, the precipitate was collected, washed with water and dried. Recrystallisation from methanol containing a few drops of pyridine afforded 17α-chlorethynyl - 3,17β - dimethoxy-oestra - 2,5(10)-diene as a colourless solid, characterised by its infrared spectrum, $\nu_{max.}^{CCl_4}$ 2200, 1595 and 1665 cm.$^{-1}$, $\nu_{max.}^{CS_2}$ 1223, 1100 and 787 cm.$^{-1}$.

M.P. 101.5–102° C., $[\alpha]_D^{27}$ +59.3° (c., 1.648 in dioxan A.R.).

The compound had claudogenic activity.

*17α-chlorethynyl-17β-methoxy-oestra-5(10)-en-3-one*

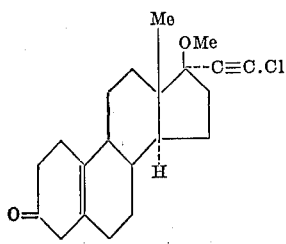

To a suspension of 17α-chlorethynyl-3,17β-dimethoxy-oestra-2,5(10)-diene (2.0 g.) in methanol (250 ml.) at room temperature was added a solution of oxalic acid (4.0 g.) in water (40 ml.), and the mixture was stirred for 45 minutes. Water was added and the mixture extracted with ether, the ethereal solution being washed with aqueous sodium bicarbonate solution and then with water, dried over sodium sulphate and stripped. Purification of the residue by chromatography on alumina which had been treated with ethyl acetate, eluting with benzene, afforded 17α - chlorethynyl-17β-methoxy-oestr-5(10)-en-3-one as a colourless solid, purified from methanol containing a few drops of pyridine and characterised by its infrared spectrum, $\gamma_{max.}^{CCl_4}$ 2210, 1723 cm.$^{-1}$, $\gamma_{max.}^{CS_2}$ 1098 cm.$^{-1}$ $[\alpha]_D^{26}$ +92° (c., 0.854 in dioxan)

M.P. 116–116.5° C., $[\alpha]_D^{26}$ +103.5° (c., 0.592 in dioxan A.R.).

The compound had progestational, ovulation-inhibiting and claudogenic activity.

*17α-chlorethynyl-17β-methoxy-oestra-4,9(10)-dien-3-one*

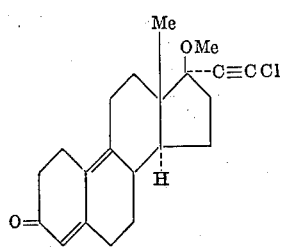

Bromine (0.3 ml.) was added dropwise to stirred anhydrous pyridine (10 ml.) cooled in ice. A solution of 17α - chlorethynyl - 17β - methoxy - oestr - 5(10)-en-3-one (2.0 g.) in anhydrous pyridine (10 ml.) was added all at once. The mixture was stirred for 10 minutes, the cooling-bath removed and the mixture stirred for a further 10 minutes and then poured into cold water. The resulting precipitate was collected and taken-up in ether, and the ether solution was washed with water, dried over sodium sulphate and stripped. Purification of the resulting gum in the usual way by chromatography on alumina, eluting with benzene, afforded 17α-chlorethynyl - 17β - methoxy - oestra - 4,9(10) - dien-3-one as a solid, characterised by its infrared and ultraviolet spectra, $\gamma_{max.}$ 302 mμ, 236–237 mμ.

$\nu_{max.}^{CCl_4}$ 2215, 1669, 1613 cm.$^{-1}$, $\nu_{max.}^{CS_2}$ 1098 cm.$^{-1}$ The compound had progestational, ovulation-inhibiting and claudogenic activity.

EXAMPLE 5

*17α-chlorethynyl-3,17β-dimethoxy-19-nor-androsta-3,5-diene*

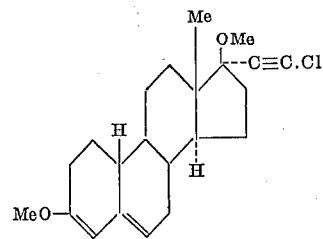

Sodium (0.67 g.) and a trace of ferric nitrate were added to liquid ammonia (100 ml.) at −80 to −60° C. and the mixture was stirred until the blue colour disappeared. A solution of 17α-chlorethynyl-3-methoxy-19-nor-androsta-3,5-dien-17β-ol (3.7 g.) (Belgian Patent No. 606,935) in anhydrous tetrahydrofuran (100 ml.) was added dropwise and the mixture was stirred for 1 hour. Methyl iodide (1.85 ml.) in anhydrous tetrahydrofuran (15 ml.) was added, stirring was continued for a further 3 hours, and the mixture was poured on to ice. When the ice had melted, the precipitate was collected, washed and dried. Purification from methanol containing a drop of pyridine afforded 17α-chlorethynyl-3,17β-dimethoxy-19-nor-androsta-3,5-diene as colourless needles, characterised by infrared and ultra-violet spectra, $\lambda_{max}$, 241–242 mμ (ε, 18.480), $\nu_{max.}^{CCl_4}$ 2214, 1654.5, 1627 cm.$^{-1}$ $\nu_{max.}^{CS_2}$ 1237, 1167, 1096 cm.$^{-1}$ The compound had progestational, ovulation-inhibiting and claudogenic activity.

*17α-chlorethynyl-17β-methoxy-19-nor-androst-4-en-3-one*

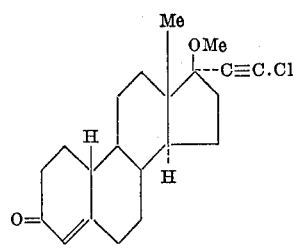

Aqueous hydrochloride acid (3 N; 140 ml.) was added to 17α - chlorethynyl-3,17β-dimethoxy-19-nor-androsta-3,5-diene (3.0 g.) in methanol (280 ml.) and the mixture was heated at 60–65° C. for 15 minutes, cooled, and poured into cold water.

This mixture was extracted with ether, the ethanol solution being washed with aqueous sodium bicarbonate solution and then with water dried over sodium sulphate and stripped. Purification by chromatography on alumina, eluting with benzene, and recrystallisation from methanol, afforded 17α-chlorethynyl-17β-methoxy-19-nor-androst-4-en-3-one as a colourless solid, M.P. 105.5–106° C., $[\alpha]_D^{23}$ −58.4° (c., 1.0296 in dioxan A.R.), $\lambda_{max.}$ 239–240.5 mμ (ε, 16620), $\nu_{max.}^{CCl_4}$ 2200, 1682, 1623 cm.$^{-1}$, $\nu_{max.}^{CS_2}$ 1099 cm.$^{-1}$.

The compound had progestational, ovulation-inhibiting and claudogenic activity.

17α-chlorethynyl-17β-methoxy-19-nor-androst-4-en-3β-ol

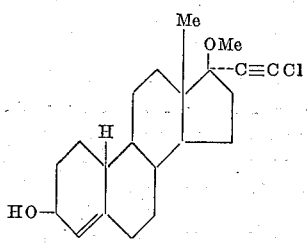

To a stirred solution of 17α-chlorethynyl-17β-methoxy-19-nor-androst-4-en-3-one (2.6 g.) in methanol (100 ml.) containing water (0.1 ml.) was added, in portions, during 3 hours, sodium borohydride (1.25 g.). The mixture was allowed to stand overnight and then diluted with water and extracted with ether. The ethereal solution was washed, dried, the solvent removed, and the residual gum was purified by chromatography on alumina. Elution with benzene and crystallisation from hexane gave 17α-chlorethynyl-17β-methoxy-19-nor-androst-4-en-3β-ol as colourless needles, M.P. 129–129.5° C., $[\alpha]_D^{25}$ −51.7° (c., 1.0512 in dioxan A.R.), $\nu_{max.}^{CCl_4}$ 3600, 2200, 1660 cm.$^{-1}$, $\nu_{max.}^{CS_2}$ 1096 cm.$^{-1}$ The compound had progestational, ovulation-inhibiting and claudogenic activity.

Acetylation of this product with acetic anhydride in pyridine, at 50° C. for 2 hours, followed by dilution with water, gave a precipitate of 17α-chlorethynyl-17β-methoxy-19-nor-androst-4-en-3β-ol acetate, purified from hexane as colourless needles, M.P. 109.5° C., $[\alpha]_D^{23}$ −86° (c., 1.02 in dioxan A.R.), $\nu_{max.}^{CCl_4}$ 2200, 1734, 1666, 1241 cm.$^{-1}$

EXAMPLE 6

*17α-chlorethynyl-17β-methoxy-oestra-1,3,5(10)-triene*

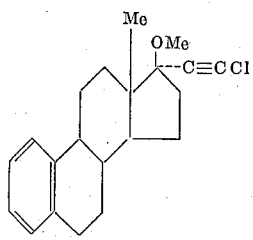

Sodium (2.25 g.) and a trace of ferric nitrate were added to liquid ammonia (200 ml.) and the mixture was stirred under reflux until the blue colour had disappeared. The mixture was cooled to −60° C. and a solution of trans-dichlorethylene (4.8 g.) in anhydrous ether (25 ml.) was added during 15 minutes. The cooling-bath was removed and the mixture stirred under reflux for 30 minutes. A solution of oestra-1,3,5(10)-triene-17-one (Caspi, Cullen and Grover, Journ. Chem. Soc., 1963, 212) (2.8 g.) in anhydrous tetrahydrofuran (50 ml.) was added during 15 minutes, and the mixture refluxed for 3 hours, and then cooled to −60° C. A solution of methyl iodide (7.15 g.) in anhydrous tetrahydrofuran (25 ml.) was added and the mixture was stirred for a further 3 hours and then poured onto ice. After the ice had melted the precipitate was collected, washed with water and dried. Purification by chromatography in hexane on alumina, followed by recrystallisation from hexane, yielded 17α-chlorethynyl-17β-methoxy-oestra-1,3,5(10)-triene as colourless needles, M.P. 110.5–111° C., $[\alpha]_D^{27}$ −33.7° (c., 1.10 in chloroform), $\nu_{max.}^{Nujol}$ 2220, 1490, 1095, 740 cm.$^{-1}$

EXAMPLE 7

*17α-chlorethynyl-17β-methoxy-androst-4-en-3-one*

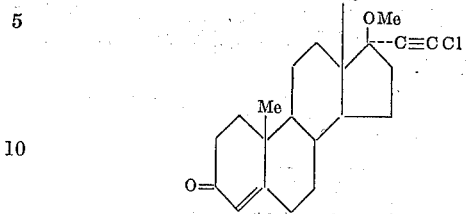

Methyl iodide (52.8 g.) in anhydrous ether (100 ml.) was added slowly to a stirred suspension of lithium (5.43 g.) in ether (200 ml.). The mixture was refluxed for a short time and then cooled to 0° C. Nitrogen was passed through the apparatus and trans-dichlorethylene (16 ml.) in ether (50 ml.) was added dropwise. The mixture was stirred at room temperature for 1½ hours, and a solution of 3-ethoxy-androsta-3,5-dien-17-one (15.0 g.) (Serini and Koster, Chem. Ber., 1938, 71, 1766) in toluene (100 ml.) was added during 15 minutes. The mixture was stirred under reflux for 3 hours, cooled to −60° C., and treated with a saturated aqueous solution of ammonium chloride (20 ml.). The mixture was allowed to warm to room temperature and the product was isolated by extraction with ether, and recrystallised from ethanol containing a trace of pyridine, which afforded 17α-chlorethynyl-3-ethoxy-androsta-3,5-dien-17β-ol sufficiently pure for the next stage.

Sodium metal (2.2 g.) and a trace of ferric nitrate were added to liquid ammonia (350 ml.) at −80 to −60° C., and the mixture was stirred until the blue colour disappeared. 17α-chlorethynyl-3-ethoxy-androsta-3,5-dien-17β-ol (11.3 g.) in anhydrous tetrahydrofuran (350 ml.) was added dropwise and the mixture was stirred for 1½ hours. Methyl iodide (6.5 ml.) in anhydrous tetrahydrofuran (40 ml.) was added slowly and the mixture was stirred for 3 hours and poured onto ice. The resulting precipitate was collected and dissolved in methanol (400 ml.). p-Toluene-sulphonic acid (1.5 g.) and water (15 ml.) were added and the solution was refluxed for 1 hour, cooled, diluted with water and extracted with ether. The ethereal solution was washed with sodium bicarbonate solution and with water, dried ($Na_2SO_4$) and evaporated at reduced pressure. The residue was recrystallised from methanol, giving 17α-chlorethynyl-17β-methoxy-androst-4-en-3-one as colourless crystals, M.P. 147–147.5° C., $[\alpha]_D^{23}$ −6.38° (c., 0.9406 in dioxan A.R.), $\lambda_{max.}$ 240.5 mμ (ε, 15,880).

The compound had progestational, ovulation-inhibiting and claudogenic activity.

EXAMPLE 8

*17α-chlorethynyl-17β-ethoxy-3-methoxy-oestra-1,3,5(10)-triene*

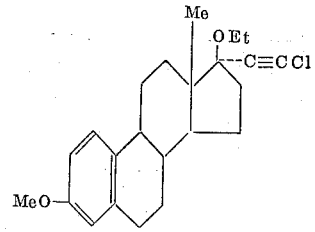

Sodium metal (1,36 g.) and a trace of ferric nitrate were added to liquid ammonia (150 ml.), and the mixture was stirred at −80 to −60° C. until the blue colour disappeared. A solution of 17α-chlorethynyl-3-methoxy-oestra-1,3,5(10)-trien-17β-ol (4.03 g.) in tetrahydrofuran (60 ml.) was added dropwise and the mixture was stirred for two hours, treated with ethyl iodide (7.19 g.) in tetrahydrofuran (15 ml.), stirred for a further 13 hours, and poured on to ice. The product was extracted with ether and the ethereal solution was washed with water, dried (Na$_2$SO$_4$) and evaporated. Recrystallisation of the residue from methanol gave 17α-chlorethynyl-17β-ethoxy-3-methoxy-oestra-1,3,5(10)-triene, M.P. 96° C., [α]$_D^{25}$ −13.5° (c., 1.02 in dioxan A.R.), λ$_{max.}$ 279 mµ (ε, 1,910), 287.5 mµ (ε, 1,820), $\nu_{max.}^{CCl_4}$ 2200, 1610 cm.$^{-1}$, $\nu_{max.}^{CS_2}$ 1387, 1279, 1256, 1237, 1138, 1117, 1090, 1047 cm.$^{-1}$

EXAMPLE 9

*3-n-propoxy-17α-chlorethynyl-17β-methoxy-oestra-2,5(10)-diene*

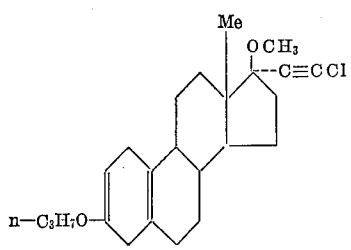

Oestrone 3-n-propyl ether (U.S. Patent 2,855,412) (19.6 g.) in a mixture of anhydrous tetrahydrofuran (300 ml.) and tert-butanol (300 ml.) was added at −70° C. to stirred liquid ammonia (3½ l.) which had been distilled from sodium to free it from traces of moisture and of iron. Sodium (50 g.) was added in portions during 30 minutes and the mixture was stirred at its reflux temperature for 4½ hours. Excess of sodium was destroyed by the addition of methanol (300 ml.) and the ammonia was allowed to evaporate. Water (600 ml.) was added, and, under an atmosphere of nitrogen at reduced pressure, solvent was removed, with gentle heating to not more than 40° C. The precipitated 3-n-propoxy-oestra-2,5(10)-dien-17β-ol was collected and dried, and was used in the next stage without further purification, M.P. 90–94° C.

Solvent (ca. 50 ml.) was distilled from a solution of 3-n-propoxy-oestra-2,5(10)-dien-17β-ol (14.7 g.) in toluene (600 ml.) and cyclohexanone (150 ml.). Aluminium isopropoxide (15.15 g.) in anhydrous toluene (200 ml.) was added, and the solution was refluxed for 2 hours under nitrogen, cooled, and treated with saturated Rochelle salt solution (200 ml.). Solvent was removed by steam-distillation under nitrogen, and the residual gum was purified from methanol containing a trace of pyridine, affording 3-n-propoxy-oestra-2,5(10)-dien-17-one, M.P. 135.5–136° C., [α]$_D^{24}$ +176.5° (c., 0.874 in dioxan), $\nu_{max.}^{CCl_4}$ 1744, 1695, 1666 cm.$^{-1}$, $\nu_{max.}^{CS_2}$ 1372, 1227, 1202, 1166, 1147, 1122, 1097, 1049, 1032, 997, 968, 789 cm.$^{-1}$ A solution of methyl iodide (15.4 g.) in ether (25 ml.) was slowly added to a stirred suspension of lithium (1.50 g.) in ether (20 ml.) under nitrogen, at such a rate that the ether refluxed steadily. The mixture was refluxed for a further 15 minutes and then cooled in ice and treated with trans-dichlorethylene (6.15 g.) during 15 minutes. The mixture was stirred at room temperature for 1½ hours, a solution of 3-n-propoxy-oestra-2,5(10)-dien-17-one (4.0 g.) in tetrahydrofuran (75 ml.) was added and the resulting mixture was stirred and gently refluxed for 3 hours, cooled, and treated cautiously with saturated ammonium chloride solution (10 ml.). Ether extraction, the ethereal solution being washed with water, dried over potassium carbonate, treated with charcoal and evaporated at reduced pressure, gave a gum, which was purified from methanol containing a trace of pyridine, affording 17α-chorethynyl-3-n-propoxy-oestra-2,5(10)-dien-17β-ol, M.P. 149.5° C., [α]$_D^{24}$ +63.9° (c., 1.062 in dioxan A.R.), $\nu_{max.}^{CCl_4}$ 3615, 2210, 1695, 1665 cm.$^{-1}$, $\nu_{max.}^{CS_2}$ 1381, 1247, 1218, 1196, 1134, 1063, 1051, 1019, 971, 790 cm.$^{-1}$ Sodium (0.25 g.) and a trace of ferric nitrate were added to liquid ammonia (75 ml.) and the solution was stirred at −60° C. until the blue colour disappeared. 17α-chlorethynyl-3-n-propoxy-oestra-2,5(10)-dien-17β-ol (2.0 g.) in tetrahydrofuran (30 ml.) was added and the mixture was stirred for 1½ hours and then treated with a solution of methyl iodide (0.65 ml.) in tetrahydrofuran (10 ml.) and stirred for a further 3 hours, and poured on to ice. The precipitate was collected and purified from methanol/petroleum ether as 3-n-propoxy-17α-chlorethynyl - 17β - methoxy-oestra-2,5(10)-diene, M.P. 135° C., [α]$_D^{25}$ +50.5° (c., 1.058 in dioxan A.R.), $\nu_{max.}^{CCl_4}$ 2200, 1696, 1665 cm.$^{-1}$, $\nu_{max.}^{CS_2}$ 1380, 1217, 1200, 1163, 1135, 1099, 973, 788 cm.$^{-1}$ The compound had progestational, ovulation-inhibiting and claudogenic activity.

EXAMPLE 10

*17α-chlorethynyl-3,17β-dimethoxy-oestra-1,3,5(10),8,14-pentaene*

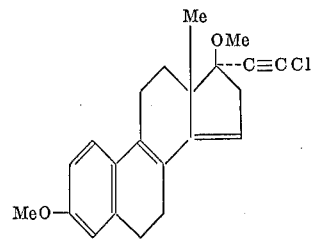

Methyl iodide (11.4 g.) in anhydrous ether (20 ml.) was added slowly to a stirred suspension of lithium (1.11 g.) in anhydrous ether (20 ml.), under nitrogen, under reflux. The solution was heated gently for a short time and then cooled in ice, and treated during 20 minutes with transdichlorethylene (4 g.) in ether (10 ml.). The mixture was stirred at room temperature for 1½ hours, and 3-methoxy-oestra-1,3,5(10),8,14-pentaen-17-one (2.8 g.) (Hughes and Smith, Chem. and Ind. 1960, 1022, Crispin and Whitehurst, Proc. Chem. Soc., 1962, 356) in anhydrous tetrahydrofuran (60 ml.) was added slowly. The mixture was refluxed with stirring for 3 hours, and then cooled to −60° C. Saturated aqueous ammonium chloride (7.5 ml.) was added, the mixture was allowed to warm to room temperature, and the product was isolated by extraction with ether and purified by recrystallisation from aqueous methanol, affording solid 17α-chlorethynyl-3-methoxy-oestra-1,3,5(10),8,14-pentaen-17β-ol, $\nu_{max.}^{CCl_4}$ 3610, 2215 cm.$^{-1}$, λ$_{max.}$ 313 mµ (ε, 34,320)

Sodium metal (0.29 g.) and a trace of ferric nitrate were added to liquid ammonia (50 ml.) and the mixture was stirred at −80 to −60° C., until the blue colour disappeared. 17α-chlorethynyl-3-methoxy-oestra-1,3,5(10),8,14-pentaen-17β-ol (1.7 g.) in tetrahydrofuran (50 ml.) was added dropwise and the mixture was stirred for 2 hours, treated with methyl iodide (0.79 ml.) in tetrahydrofuran (5 ml.), stirred for a further 3 hours and poured on to ice. Extraction with ether and purification from methanol afforded solid 17α-chlorethynyl-3,17β-dimethoxy-oestra-1,3,5(10),8,14-pentaene, $\gamma_{max.}^{CCl_4}$ 2210 cm.$^{-1}$, λ$_{max.}$ 313 mµ (ε, 34,580).

EXAMPLE 11

*17α-chlorethynyl-3-ethoxy-17β-methoxy-oestra-1,3,5(10)-triene*

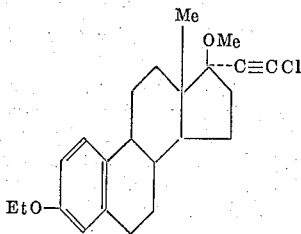

A solution of methyl iodide (19.4 g.) in ether (30 ml.) was added to a suspension of lithium (1.94 g.) in ether (25 ml.), under nitrogen, at such a rate that the ether refluxed steadily. The mixture was refluxed for a further 15 minutes and then cooled in ice and treated with transdichloroethylene (6.9 g.) in ether (15 ml.) during 15 minutes, and stirred for 1½ hours at room temperature. Cestrone-3-ethyl ether (Courrier, Velluz, Alloiteau and Rousseau, Compt. Rend. Soc. Biol., 1945, 139, 128) (5.0 g.) in tetrahydrofuran (125 ml.) was added and the mixture was stirred and refluxed gently for 3 hours, cooled, and treated cautiously with saturated ammonium chloride solution (15 ml.). The product was extracted with ether and the ethereal solution was washed with water, dried over sodium sulphate and evaporated at reduced pressure. The residue was recrystallised from aqueous methanol, affording colourless needles of 17α-chlorethynyl-3-ethoxy-oestra-1,3,5(10)-trien-17β-ol, M.P. 149–151° C., sufficiently pure for the next stage.

Sodium metal (0.44 g.) and a trace of ferric nitrate were added to liquid ammonia (75 ml.) at −80 to −60° C., and the mixture was stirred until the blue colour disappeared. A solution of 17α-chlorethynyl-3-ethoxy-oestra-1,3,5(10)-trien-17β-ol (2.55 g.) in anhydrous tetrahydrofuran (50 ml.) was added dropwise and the mixture was stirred for 2 hours. Methyl iodide (2.55 g.) in anhydrous tetrahydrofuran (10 ml.) was added, stirring was continued at −80 to −60° C. for a further 3 hours and the mixture was poured on to ice. After the ice had melted, a slight excess of acetic acid was added and the precipitate was collected, washed with water and dried. Purification by chromatography in benzene on alumina followed by recrystallisation from methanol, yielded 17α-chlorethynyl-3-ethoxy-17β-methoxy-oestra-1,3,5(10) - triene, M.P. 124.5° C., $[\alpha]_D^{25}$ −17.9° (c., 1.038 in dioxan A.R.), $\lambda_{max.}$ 279 mµ ($\epsilon$, 1810), $\lambda_{max.}$ 288 mµ ($\epsilon$, 1690), $\nu_{max.}^{CCl_4}$ 2200, 1609 cm.$^{-1}$, $\nu_{max.}^{CS_2}$ 1380, 1281, 1255, 1238, 1136, 1115, 1101, 1057 cm.$^{-1}$ The compound had progestational, ovulation-inhibiting and claudogenic activity.

EXAMPLE 12

*17α-chlorethynyl-17β-methoxy-3-n-propoxy-oestra-1,3,5(10)-triene*

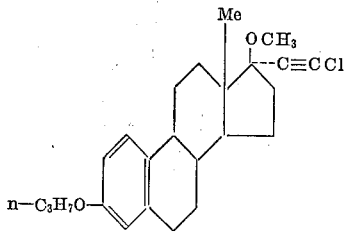

Sodium metal (4.05 g.) and a trace of ferric nitrate were added to liquid ammonia (300 ml.) and the mixture was stirred until the blue colour disappeared. At −60° C., trans-chlorethylene (8.5 g.) in anhydrous tetrahydrofuran (15 ml.) was added slowly, the cooling-bath was removed, and the mixture was stirred for 30 minutes under reflux. A solution of oestrane-3-n-propyl ether (U.S. Patent 2,855,412) (5.0 g.) in anhydrous tetrahydrofuran was added slowly and the mixture was stirred and allowed to reflux for 3 hours. Ammonium chloride (20 g.) was added in portions and the ammonia was allowed to evaporate. The product was isolated by extraction with ether and evaporation of the solvent at reduced pressure. The residual gum solidified when triturated with hexane. Recrystallisation from aqueous ethanol gave 17α-chlorethynyl-3-n-propoxy-oestra - 1,3,5(10)-trien-17β-ol as colourless needles, M.P. 127–127.5° C., $[\alpha]_D^{24}$ −9.0° (c., 0.816 in dioxan A.R.).

Sodium metal (0.2 g.) and a trace of ferric nitrate were added to liquid ammonia (75 ml.) at −80 to −60° C. and the mixture was stirred until the blue colour disappeared. A solution of 17α-chlorethynyl-3-n-propoxy-oestra-1,3,5(10)-trien-17β-ol (3.0 g.) in anhydrous tetrahydrofuran (50 ml.) was added dropwise and the mixture was stirred for 2 hours. Methyl iodide (0.55 ml.) in anhydrous tetrahydrofuran (50 ml.) was added, stirring was continued at −80 to −60° C. for a further 3 hours and the mixture was poured on to ice. After the ice had melted, a slight excess of acetic acid was added and the precipitate was collected, washed with water and dried. Purification by chromatography in benzene on alumina followed by recrystallisation from methanol, yielded 17α-chlorethynyl-17β-methoxy-3-n-propoxy-oestra - 1,3,5(10)-triene as colourless needles, M.P. 115.5–116° C., $[\alpha]_D^{26}$ −19.9° (c., 0.8975 in dioxan A.R.), $\nu_{max.}^{CCl_4}$ 2210, 1610 cm.$^{-1}$, $\nu_{max.}^{CS_2}$ 1256, 1233, 1100, 990 cm.$^{-1}$ The compound had progestational, ovulation-inhibiting and claudogenic activity.

EXAMPLE 13

*17α-chlorethynyl-17β-methoxy-4-methyl-oestra-1,3,5(10)-triene*

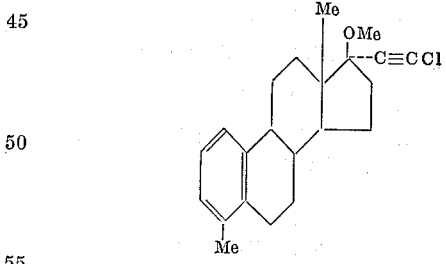

Sodium metal (0.50 g.) and a trace of ferric nitrate were added to liquid ammonia (75 ml.) at −80 to −60° C. and the mixture was stirred until the blue colour disappeared. A solution of 17α-chlorethynyl-4-methyl-oestra-1,3,5(10)-trien-17β-ol (Burgess et al., Journ. Chem. Soc., 1962, 4995) (4.15 g.) in anhydrous tetrahydrofuran (60 ml.) was added dropwise and the mixture was stirred for 2 hours. Methyl iodide (1.3 ml.) in anhydrous tetrahydrofuran (5 ml.) was added, stirring was continued at −80 to −60° C., for a further 3 hours and the mixture was poured on to ice. After the ice had melted, a slight excess of acetic acid was added and the precipitate was collected, washed with water and dried. Purification by chromatography in benzene on alumina followed by recrystallisation from methanol, yielded colourless needles of 17α - chlorethynyl - 17β - methoxy - 4 - methyl-oestra-1,3,5(10)-triene M.P. 109.8–110.2° C., $[\alpha]_D^{30}$ −27.1° C. in dioxan, $\lambda_{max.}$ 269.5 mµ ($\epsilon$, 172), 263 mµ ($\epsilon$, 229), $\lambda$ inf. 259 mµ ($\epsilon$, 197), $\nu^{CCl_4}$ 3080, 3030, 2220 cm.$^{-1}$.

EXAMPLE 14

*17α-chlorethynyl-3,17β-dimethoxy-oestra-1,3,5(10),8-tetraene*

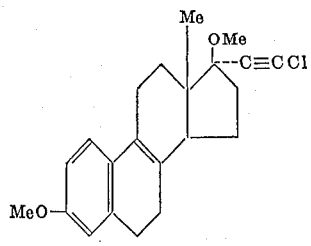

Methyl iodide (12.45 g.) in anhydrous ether (20 ml.) was added slowly to a stirred suspension of lithium (1.21 g.) in anhydrous ether (20 ml.) under nitrogen, under reflux. The solution was heated gently for a short time and then cooled in ice and treated during 20 minutes with transdichlorethylene (4.36 g.) in ether (10 ml.). The mixture was stirred at room temperature for 1½ hours and (±)-8-dehydro-oestrone-methyl ether (Hughes and Smith, Chem. and Ind. 1960, 1022) (3.08 g.) in anhydrous tetrahydrofuran (60 ml.) was added slowly. The mixture was refluxed with stirring for 3 hours and then cooled to −60° C. Saturated aqueous ammonium chloride (7.5 ml.) was added, the mixture was allowed to warm to room temperature and the product was isolated by extraction with ether and purified from aqueous methanol, affording solid 17α-chlorethynyl-3-methoxy-oestra-1,3,5(10),8-tetraen-17β-ol, $\nu_{max.}^{CCl_4}$ 3615, 2220 cm.$^{-1}$, $\lambda_{max.}$ 278 m$\mu$ Sodium metal (0.28 g.) and a trace of ferric nitrate were added to liquid ammonia (50 ml.) and the mixture was stirred at −80 to −60° C., until the blue colour disappeared. 17α-Chlorethynyl-3-methoxy-oestra-1,3,5(10),8-tetraen-17β-ol (1.64 g.) in tetrahydrofuran (50 ml.) was added dropwise and the mixture was stirred for 2 hours, treated with methyl iodide (0.76 ml.) in tetrahydrofuran (5 ml.), stirred for a further 3 hours, and poured on to ice. Extraction with ether and purification from methanol afforded solid 17α-chlorethynyl-3,17β-dimethoxy-oestra-1,3,5(10),8-tetraene, $\nu_{max.}^{CCl_4}$ 2215 cm.$^{-1}$, $\lambda_{max.}$ 278 m$\mu$

EXAMPLE 15

*17α-chlorethynyl-3,17β-dimethoxy-oestra-1,3,5(10)6,8-pentaene*

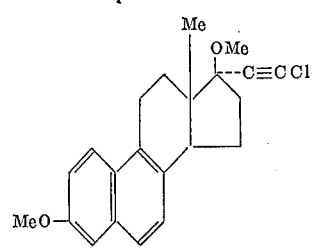

Methyl iodide (8.2 g.) in anhydrous ether (15 ml.) was added slowly to a stirred suspension of lithium (0.8 g.) in anhydrous ether (15 ml.) under reflux under nitrogen. The solution was heated gently for a short time and then cooled in ice and treated with trans-dichlorethylene (2.86 g.) in ether (10 ml.). The mixture was stirred at room temperature for 1½ hours and equilenin-3-methyl ether (Cohen, Cook, Hewitt and Girard, Journ. Chem. Soc., 1934, 653) (2.0 g.) in anhydrous tetrahydrofuran (50 ml.) was added slowly. The mixture was refluxed with stirring for 3 hours and then cooled to −60° C. Saturated aqueous ammonium chloride (7.5 ml.) was added, the mixture was allowed to warm to room temperature and the product was isolated by extraction with ether and purified from methanol, affording solid 17α-chlorethynyl - 3 - methoxy-oestra-1,3,5(10)6,8-pentaen-17β-ol, $\nu_{max.}^{CCl_4}$ 3620, 2220 cm.$^{-1}$, $\lambda_{max.}$ 228, 278, 324, 339 m$\mu$ Sodium metal (0.24 g.) and a trace of ferric nitrate were added to liquid ammonia (40 ml.) and the mixture was stirred at −80 to −60° C., until the blue colour disappeared. 17α-Chlorethynyl-3-methoxy-oestra-1,3,5(10) 6,8-pentaen-17β-ol (1.4 g.) in tetrahydrofuran (50 ml.) was added dropwise and the mixture was stirred for 2 hours, treated with methyl iodide (0.65 ml.) in tetrahydrofuran (5 ml.), stirred for a further 3 hours and poured on to ice. Extraction with ether and purification from methanol afforded solid 17α-chlorethynyl-3,17β-dimethoxy-oestra-1,3,5(10)6,8-pentaene, $\nu_{max.}^{CCl_4}$ 2215 cm.$^{-1}$, $\lambda_{max.}$ 228 m$\mu$ ($\epsilon$, 49,100), $\lambda_{max.}$ 278 m$\mu$ ($\epsilon$, 4,890), $\lambda_{max.}$ 324 m$\mu$ ($\epsilon$, 1,975), $\lambda_{max.}$ 339 m$\mu$ ($\epsilon$, 2,455)

EXAMPLE 16

*17α-chlorethynyl-2-chloro-4-methyl-17β-methoxy-oestra-1,3,5(10)-trien*

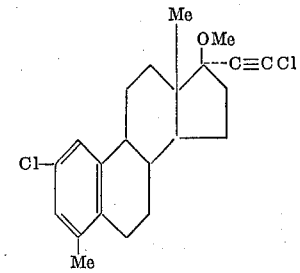

Sodium metal (0.18 g.) and a trace of ferric nitrate were added to liquid ammonia (60 ml.) at −80 to −60° C., and the mixture was stirred until the blue colour disappeared. 17α - chlorethynyl - 2 - chloro - 4 - methyl-oestra - 1,3,5(10)-trien-17β-ol (Burgess, Burn, Ducker, Ellis, Feather, Hiscock, Leftwick, Mills and Petrow, Journ. Chem. Soc., 1962, 4995) (2.8 g.) in anhydrous tetrahydrofuran (50 ml.) was added dropwise and the mixture was stirred for 2 hours. Methyl iodide (0.44 ml.) in tetrahydrofuran (5 ml.) was added, stirring was continued at −80 to −60° C. for a further 3 hours, and the mixture was poured on to ice. After the ice had melted, a slight excess of acetic acid was added, and the precipitate was collected, washed and dried. Purification from aqueous methanol afforded 17α-chlorethynyl-2-chloro-4-methyl-17β-methoxy-oestra - 1,3,5(10)-triene as a colourless solid, $\lambda_{max.}$ 272 m$\mu$ ($\epsilon$, 455), $\lambda_{max.}$ 281 m$\mu$ ($\epsilon$, 380), $\nu_{max.}^{CCl_4}$ 2210 cm.$^{-1}$

EXAMPLE 17

*17α-chlorethynyl-6-methyl-3,17β-dimethoxy-19-nor-androsta-3,5-diene*

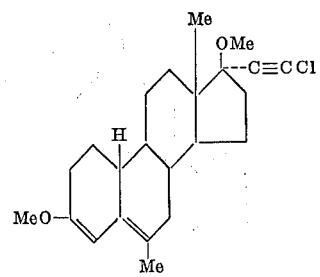

Sodium (0.5 g.) and a trace of ferric nitrate were added to liquid ammonia (75 ml.) at −80 to −60° C., and the mixture was stirred until the blue colour disappeared.

17α-chlorethynyl-6-methyl - 3 - methoxy-19-nor-androsta-3,5-diene-17β-ol (Belgian Patent No. 606,935) (3.0 g.) in anhydrous tetrahydrofuran (75 ml.) was added dropwise and the mixture was stirred for 1 hour. Methyl iodide (1.37 ml.) in anhydrous tetrahydrofuran (10 ml.) was added, stirring was continued at −80 to −60° C., for a further 3 hours, and the mixture poured on to ice. After the ice had melted, the precipitate was collected, washed and purified from aqueous methanol (containing a few drops of pyridine) affording 17α-chlorethynyl-6-methyl-3,17β-dimethoxy - 19-nor-androsta-3,5-diene as a colourless solid, $\lambda_{max.}$ 247 m$\mu$ ($\epsilon$, 19,095), $$\gamma_{max.}^{CCl_4}\ 2220\ cm.^{-1}$$

A mixture of 17α-chloroethynyl - 6-methyl-3,17β-dimethoxy - 19-nor-androsta - 3,5-diene (1.0 g.), methanol (200 ml.) and a solution of oxalic acid (2.25 g.) in water (25 ml.) was heated under reflux for 1 hour, cooled and poured into water. Ether extraction, washing with sodium bicarbonate solution and with water, drying and stripping, yielded a residue, which, purified from methanol, afforded 17α-chlorethynyl - 6α - methyl - 17β-methoxy-19-nor-androst-4-en-3-one, as a solid, $\lambda_{max.}$ 240 m$\mu$ ($\epsilon$, 15,390)

$$\gamma_{max.}^{CCl_4}\ 2210,\ 1681,\ 1619\ cm.^{-1}$$

EXAMPLE 18

*17α-chlorethynyl-3,3-ethylenedioxy-4-methyl-17β-methoxy-androst-4-ene*

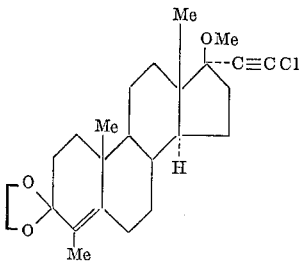

A solution of methyl iodide (5.2 g.) in anhydrous ether (10 ml.) was added slowly to a stirred suspension of lithium (0.50 g.) in anhydrous ether (25 ml.), the mixture was refluxed briefly and then cooled to 0° C. Nitrogen was passed through the apparatus and a solution of trans-dichlorethylene (1.83 g.) in ether (10 ml.) was added during 30 minutes. The mixture was allowed to warm to room temperature and stirring was continued for 1½ hours. A solution of 3,3-ethylenedioxy-4-methyl-androst-4-en-17-one (Belgian Patent No. 606,935) (1.51 g.) in anhydrous toluene (40 ml.) was added, and the mixture was stirred and refluxed for 2 hours, cooled to −60° C., treated with saturated ammonium chloride solution (5 ml.) and allowed to warm to room temperature. Ether extraction, the ethereal solution being washed, dried and evaporated at reduced pressure, afforded a residue of 17α - chlorethynyl - 3,3 - ethylenedioxy - 4 - methyl-androst-4-en-17β-ol, used as such in the next stage.

Sodium metal (0.30 g.) and a trace of ferric nitrate were added to liquid ammonia (50 ml.) and the mixture was stirred at −80 to −60° C., until the blue colour disappeared. The residue of 17α-chlorethynyl-3,3-ethylenedioxy - 4-methyl-androst-4-en-17β-ol dissolved in anhydrous tetrahydrofuran (40 ml.) was added dropwise and the mixture was stirred for 2 hours. Methyl iodide (0.82 ml.) in tetrahydrofuran (10 ml.) was added, stirring was continued at −80 to −60° C., for a further 3 hours, and the mixture was poured on to ice. After the ice had melted, the precipitate was collected, washed and purified from aqueous methanol (containing a few drops of pyridine), affording 17α-chlorethynyl - 3,3 - ethylene - dioxy-4-methyl - 17β-methoxy-androst-4-ene, as a solid $$\gamma_{max.}^{CCl_4}\ 2215\ cm.^{-1}$$

A mixture of 17α-chlorethynyl-3,3-ethylenedioxy-4-methyl-17β-methoxy-androst-4-ene (0.5 g.), methanol (100 ml.) and a solution of oxalic acid (1.1 g.) in water (12 ml.) was heated under reflux for 1 hour, cooled and poured into water. Ether extraction, washing with sodium bicarbonate solution and with water, drying and stripping, afforded a residue which was purified from methanol to give 17α-chlorethynyl-4-methyl-17β-methoxy-androst-4-en-3-one as a colourless solid, $\lambda_{max.}$ 250 m$\mu$ ($\epsilon$, 15,770), $$\gamma_{max.}^{Nujol}\ 2215,\ 1696,\ 1642\ cm.^{-1}$$

EXAMPLE 19

*White scored veterinary tablets each containing 150 mg. of 17α - chlorethynyl - 3,17β-dimethoxy-oestra-1,3,5(10)-triene*

| | Mg. |
|---|---|
| 17α-chloroethynyl-3,17β-dimethoxy-oestra-1,3,5(10)-triene | 150 |
| Lactose | 200 |
| Starch | 45 |
| Starch paste, 10 percent, w./w., a sufficient quantity. | |
| Magnesium stearate | 4.5 |
| Starch, sufficient to produce 453.6 mg. | |

The first three ingredients are thoroughly mixed and granulated with a suitable quantity of 10 percent starch paste, followed by tray drying at 50° C. The resultant granules are processed through a 20 mesh sieve and the lubricant (magnesium stearate) added, together with sufficient starch to produce the required weight. After thorough mixing, tablets each weighing 453.6 mg. are compressed from the mixture, using punches of convenient diameter and suitably embossed to provide a break-line.

EXAMPLE 20

*Veterinary injection of 17α-chlorethynyl-3,17β-dimethoxy-oestra-1,3,5(10)-triene*

FORMULA

17α-chloroethynyl-3,17β - dimethoxy - oestra - 1,3,5(10-triene, reduced to very fine powder, 150 mg.
Aqueous suspending medium to 3.0 ml.

AQUEOUS SUSPENDING MEDIUM

| | Gm. |
|---|---|
| Sodium carboxymethyl cellulose | 1.1 |
| Polyoxyethylene sorbitan mono-oleate | 0.3 |
| Methyl p-hydroxybenzoate | 0.06 |
| Propyl p-hydroxybenzoate | 0.03 |
| Water for injection to 100 ml. | |

PROCESS

The polyoxyethylene sorbintan mono-oleate and the medicament are placed in the container of a ball mill and a little water is added, together with the balls. The container and contents are sterilised by heating in an autoclave and, after cooling, the container is continuously rotated on the ball mill until the active substance is reduced to a fine powder and the material in the container takes on the appearance of a white milky suspension. Samples are withdrawn, aseptically, at intervals and examined for size. Grinding is continued until a check sample shows that all particles are less than 20$\mu$ with respect to their greatest dimension.

The sodium carboxymethyl cellulose and the preservatives are dissolved, with the aid of heat, in the remainder of the water and the solution sterilised by heating in an autoclave for at least 1 hour at 10 lb. pressure.

The suspension in the container of the ball mill is separated from the balls by passing it through a sterilised funnel fitted with a fine mesh sieve. The balls and funnel are washed with some of the sodium carboxymethyl cellulose solution and the suspension and washings collected in a sterilised container. The mixture is diluted to volume with more sodium carboxymethyl cellulose solution, followed by thorough mixing. Finally, the sus-

We claim:
1. A process for the preparation of 17α-chloroethynyl-17β-alkoxy-steroids wherein the 17β-alkoxy group contains up to five carbon atoms, which process comprises reacting an alkyl halide having a corresponding alkyl group of up to five carbon atoms with the alkali metal derivative of the corresponding 17α-chloroethynyl-17β-hydroxy-steroid in liquid ammonia at a temperature between −80° C. and the reflux temperature of the mixture.

2. A process for the preparation of a 17α-chlorethynyl-17β-alkoxy-steroid wherein the alkoxy group contains up to five carbon atoms comprising forming an alkali metal derivative of the corresponding 17α-chlorethynyl-17β-hydroxy-steroid by reaction of said 17α-chlorethynyl-17β-hydroxy-steroid with an alkali metal amide or by reaction of the corresponding 17-oxo-steroid with a chloracetylide of an alkali metal, and reacting said alkali metal derivative with an alkyl halide having up to five carbon atoms in the alkyl group in an anhydrous non-hydroxylic solvent.

3. A process as claimed in claim 2 wherein the anhydrous non-hydroxylic solvent is liquid ammonia, ether or tetrahydrofuran.

4. A process as claimed in claim 2 wherein the alkali-metal derivative is formed by dissolving the 17α-chlorethylnyl-17β-hydroxy-steroid in the non-hydroxylic solvent and then treating with an amide of an alkali-metal in liquid ammonia.

5. A process as claimed in claim 2 wherein the alkali-metal derivative of the 17α-chlorethynyl-17β-hydroxy-steroid is formed by the interaction of the corresponding 17-oxo-steroid with a chloracetylide of an alkali-metal.

6. A process as claimed in claim 2 wherein the alkyl halide is methyl iodide and the reaction is completed in 1 to 3 hours.

7. A process as claimed in claim 2 wherein the 17α-chlorethynyl-17β-hydroxy steroid dissolved in anhydrous tetrahydrofuran is added to a suspension of sodamide in liquid ammonia and a solution of methyl iodide in tetrahydrofuran added.

8. A compound selected from the group consisting of compounds of the formula:

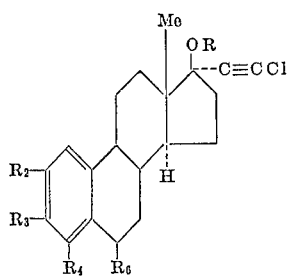

wherein,
R is an alkyl group containing not more than 5 carbon atoms,
$R_2$ is selected from the group consisting of hydrogen, methyl and chloro,
$R_3$ is selected from the group consisting of hydrogen and —$OR_1$ where $R_1$ is selected from the group consisting of lower alkyl, cyclic alkyl, benzyl and tetrahydropyranyl,
$R_4$ and $R_6$ are selected from the group consisting of methyl and hydrogen; and corresponding compounds having unsaturation at $C_8$, $C_8$ and $C_{14}$, and $C_6$ and $C_8$.

9. 17α-chlorethynyl-17β-methoxy-androst-5-en-3β-ol.
10. 17α-chlorethynyl-3,17β-dimethoxy-oestra-1,3,5(10)-triene.
11. 17α-chlorethynyl-3,17β-dimethoxy-19-nor-androsta-3,5-diene.
12. 17α-chlorethynyl-17β-methoxy-19-nor-androst-4-en-3β-ol.
13. 3-n-propoxy-17α-chlorethynyl-17β-methoxy-oestra-2,5(10)-diene.
14. 17α-chlorethynyl-3,17β-dimethoxy-oestra-1,3,5(10),8,14-pentaene.
15. 17α-chlorethynyl-3-ethoxy-17β-methoxy-oestra-1,3,5(10)-triene.
16. 17α-chlorethynyl-17β-methoxy-3-n-propoxy-oestra-1,3,5(10)-triene.
17. 17α-chlorethynyl-3,17β-dimethoxy-oestra-1,3,5(10),8-tetraene.
18. 17α-chlorethynyl-3,17β-dimethoxy-oestra-1,3,5(10),6,8-pentaene.
19. 17α-chlorethynyl-6-methyl-3,17β-dimethoxy-19-nor-androsta-3,5-diene.
20. 17α-chlorethynyl-17β-methoxy-19-nor-androst-4-en-3β-ol acetate.

21. A pharmaceutical preparation in dosage unit form comprising 17α-chlorethynyl-3,17β-dimethoxy-oestra-1,3,5,(10)-triene in admixture with lactose, magnesium stearate and starch.

22. A compound of the formula:

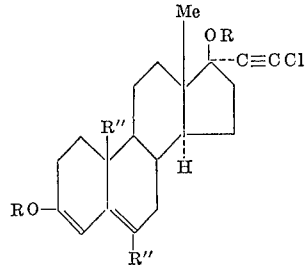

wherein R is alkyl containing up to 5 carbon atoms and R″ is hydrogen or methyl.

23. A compound of the formula:

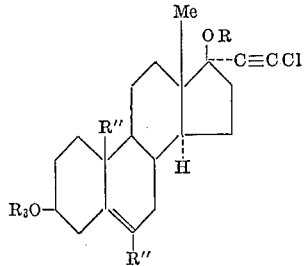

wherein R is alkyl containing up to 5 carbon atoms, R″ is hydrogen or methyl and R is hydrogen, alkyl containing up to 5 carbon atoms or lower hydrocarbon carboxylic acyl.

24. A compound of the formula:

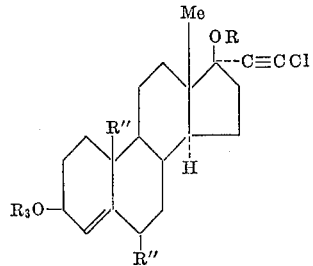

wherein R is alkyl containing up to 5 carbon atoms, R″ is hydrogen or methyl and $R_3$ is hydrogen, alkyl containing up to 5 carbon atoms or lower hydrocarbon carboxylic acyl.

(References on following page)

References Cited by the Examiner

UNITED STATES PATENTS

| | | | |
|---|---|---|---|
| 3,072,646 | 1/1963 | Fried | 260—397.4 |
| 3,092,622 | 6/1963 | Hirschmann | 260—239.5 |
| 3,121,079 | 2/1964 | Oberster et al. | 260—239.55 |
| 3,202,684 | 8/1965 | Burn et al. | 260—397.5 |

OTHER REFERENCES

Burgess et al.: "J. Chem. Soc. (1962), pages 4995–5004.

LEWIS GOTTS, *Primary Examiner.*

E. L. ROBERTS, *Assistant Examiner.*